United States Patent

Selz

[15] 3,636,477

[45] Jan. 18, 1972

[54] FREQUENCY MODULATOR INCLUDING SELECTIVELY CONTROLLABLE DELAY LINE

[72] Inventor: Jacques Selz, Viroflay, France

[73] Assignee: C. I. T. Compagnie Industrielle Des Telecommunications, Paris, France

[22] Filed: Nov. 5, 1969

[21] Appl. No.: 874,294

[30] Foreign Application Priority Data

Nov. 5, 1968 France....................................172628
Nov. 18, 1968 France....................................174264

[52] U.S. Cl...................................332/18, 325/148, 325/38, 328/155, 328/55, 332/9

[51] Int. Cl...........................................................H03c 3/08

[58] Field of Search.....................332/16, 16 T, 11 D, 18, 11, 332/9, 9 T; 328/55, 155, 134; 325/38, 38 A, 38 B, 163, 148; 307/295

[56] References Cited

UNITED STATES PATENTS

| | | | |
|---|---|---|---|
| 3,097,338 | 7/1963 | Pinet et al. | 325/38 |
| 3,271,688 | 9/1966 | Gschwind et al. | 328/55 |
| 3,278,907 | 10/1966 | Barry et al. | 307/295 X |
| 3,312,903 | 4/1967 | Webb | 332/18 X |
| 3,421,088 | 1/1969 | Salley et al. | 332/16 X |
| 3,478,170 | 11/1969 | Hanni | 332/9 |

*Primary Examiner*—Alfred L. Brody
*Attorney*—Craig, Antonelli & Hill

[57] ABSTRACT

A frequency modulated HF wave is obtained by applying a HF carrier wave of preselected frequency to a variable phase shifter consisting of a delay line made up of a plurality of switchable delay units controlled by a pulse counter to effect a periodic phase shift of 360°, wide band operation being ensured by correction of the effective capacity of the counter depending on the value of high frequency selected.

9 Claims, 2 Drawing Figures

FREQUENCY MODULATOR INCLUDING SELECTIVELY CONTROLLABLE DELAY LINE

Figure 1:
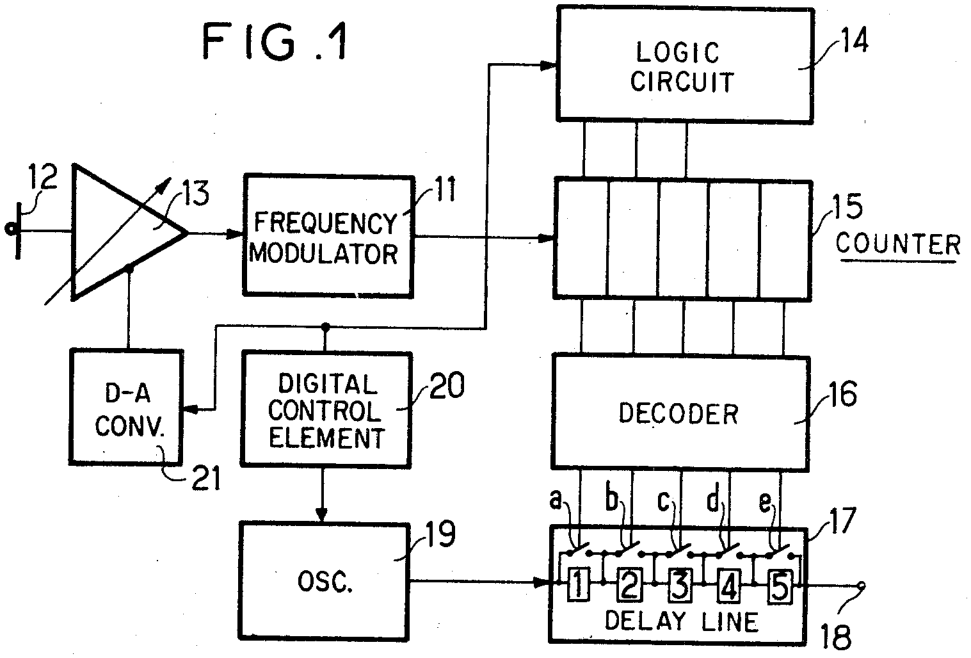

The invention concerns a device providing frequency modulation of a carrier wave whose frequency can be selected within a wide band.

The fundamental principle applied in this invention consists in rotating the phase of a fixed frequency carrier wave $F_o$ generally defined by quantized stages $\beta$, such that $\beta$=360°/$n$, the phase successively assuming the value:0°, $\beta$, 2 $\beta$,...($n$−1) $\beta$, $n\beta$=360°, $\beta$, etc.

For a phase rotation produced N times per second in a particular direction, the resulting frequency has the value $F_o$+N; if produced in the other direction, the resulting frequency has the value $F_o$−N. For any fixed value of N there is obtained a transposed frequency; for a value of N varying in accordance with an external signal, a wave with a carrier frequency $F_o$ is obtained, frequency-modulated by the external signal.

As an example, this principle, for a fairly high carrier frequency such as some tens or hundreds of megahertz, proceeds as follows:

1. The fixed-frequency wave $F_o$ is applied to a delay line consisting of a series of binary-switched cells forming in all $n$ dephasing steps.

2. A primary frequency modulator is used working at a comparatively low carrier frequency $f_o$ (some hundreds of kHz. or MHz.) to which the modulating signal to be transmitted is applied; this resulting modulated frequency has the value $f=f_o\pm\Delta f$.

3. The switching of the $n$ dephasing cells in binary series is controlled by the above frequency: $f=f_o\pm\Delta f$.

The result is a high-frequency wave modulated in the frequency:

$F'=F_o+(f_o\pm\Delta f/n)$. By this means, a high-frequency modulated wave is obtained with a highly stable carrier frequency, as well as high purity.

Such a device, however, functions correctly only at one particular value of the high-frequency carrier wave.

In fact, if we assume a delay line with $n$ steps each introducing a delay $T$, at a fixed frequency $F_o$ the delay $T$ will produce a phase shift of $\beta'$=(360°/$n$; after $n$ switching steps, the phase angle will be o°, but, for any other high-frequency $F$, the unit delay time $T$ will give a phase shift of $\beta'$=(360°/$n$)×($F/F_o$). After $n$ switching steps, the phase will not have rotated through 360°(=o°); consequently, when the ($n$+1) th switching step takes place, instead of a phase shift $\beta'$ equal to the preceding steps, we get a different phase-shift value.

The present invention provides for this problem a sufficiently accurate approximation for practical use.

According to the invention, a modulator for frequency modulation of a relatively high carrier-frequency variable over a relatively wide range, includes: an auxiliary modulator arranged to receive the modulation frequency and adapted to modulate a relatively low auxiliary carrier-frequency; a counter connected to count successive cycles of the modulated auxiliary carrier-frequency; logic circuitry arranged to sense a preselected carrier-frequency and adapted to maintain in the counter a fixed minimum reference value corresponding to the preselected carrier-frequency; and a chain of delay elements arranged to receive the carrier-frequency and adapted to be switched sequentially by preselected states of the counter to maintain a phase rotation of the order of 360°.

Figure 2:
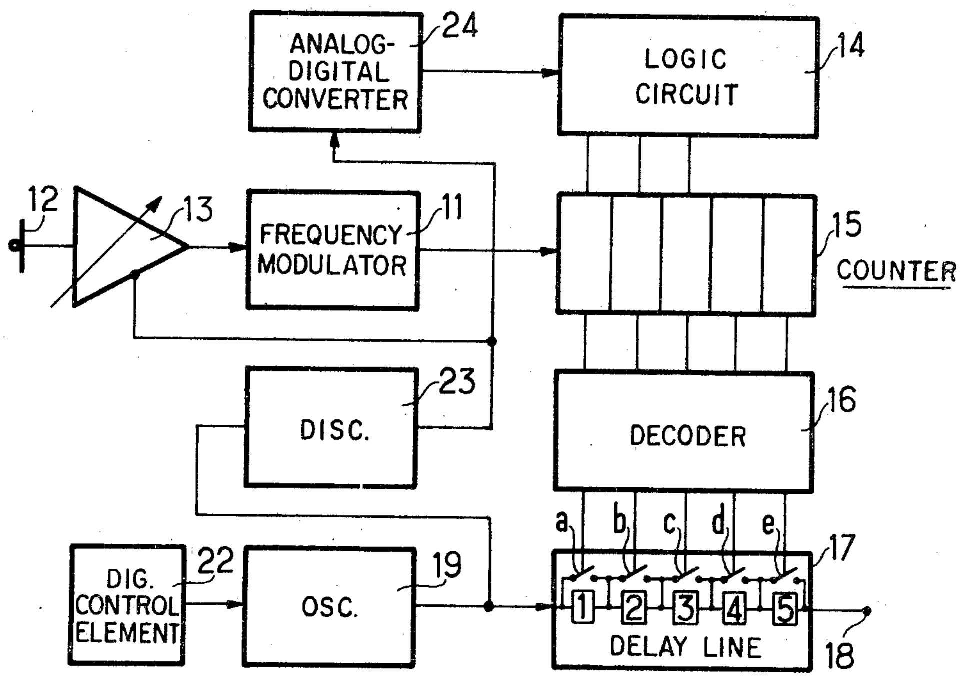

The invention will now be described in more detail by way of examples, with reference to the accompanying drawing, showing:

in FIG. 1 a block diagram of a modulator in which the operation of the counter is controlled by an element applying to the frequency $F$, and in FIG. 2 a block diagram of a modulator in which the operation of the counter is controlled by a frequency discriminator.

Referring to FIG. 1, a primary frequency modulator 11 with a carrier frequency $f_o$ of several hundreds of kilohertz or several megahertz, is in the form of a multivibrator. Such multivibrator frequency modulators with high-frequency stability are well known in the art. The primary modulator 11 receives from signals from a generator 12, such as a microphone, through a variable-gain amplifier 13.

A counter 15 receives at its input the frequency supplied by the primary frequency modulator 11, and advances one step for each period of the modulated frequency $f$ received. The counter 15 is a binary counter with five stages.

A high-frequency generator 19 supplying a preselected carrier-frequency $F$ is connected with the input of a delay line 17 comprising five cells, marked 1, 2,....., 5, which can be individually short circuited or activated by circuit breakers $a$, $b$, $c$, $d$, $e$, respectively. The circuit breakers $a$–$e$ are shown as mechanical units to simplify the diagram, but are in practice of a quick-acting electronic type such as diodes.

A decoder 16, in accordance with various preselected states of the counter 15, supplies opening or closing orders to the switching elements $a$–$e$. The output terminal 18 receives a high-frequency, modulated wave.

The high-frequency generator 19 consists of a frequency synthesizer whose output frequency is controlled by a digital control element 20 in which the preselected frequency value $F$ is set directly by decimal indexes. A logic element 14, receiving the digital states of the controller 20, supplies the counter 15 with a preselected fixed minimum reference value differing from zero, and depending on a preselected one of the frequency values held in a memory incorporated in the element 14.

A digital-analog converter 21 receives the digital states of the element 20 at its input, and supplies gain control signals to the amplifier 13.

The mode of operation is as follows:

If the carrier-frequency band to be covered is one octave, the counter 15 has a capacity of 32. For a first frequency $F_o$ forming the lower limit of the range, a phase rotation of 360° is supplied by the 32 states of the counter 15 switching the delay line 17.

In this case, the upper limit of the range corresponds to a phase rotation of 720°. To reduce this to 360°, the reference value, only 16 operations of the delay line 17 are used, for which purpose the logic element 14 applies to the counter 15 of a fixed reference value 16. Thus, the counter passes from 16 to 32, returns to 16, moves again to 32 and continues to cycle between 16 and 32.

For intermediate values between 160 and 320 MHz., the corrections applied to counter 15 at indicated reference frequencies, are applied according to an expression $n\cdot F$ the counter capacity, as shown in the following table:

| F (MHz.) | n | R |
|---|---|---|
| 160 | 32 | 0 |
| 165 | 31 | 1 |
| 171 | 30 | 2 |
| 177 | 29 | 3 |
| 269 | 19 | 13 |
| 284 | 18 | 14 |
| 301 | 17 | 15 |
| 320 | 16 | 16 |

In this table, $F$ is a reference frequency at which the content of the counter 15 is changed by one unit; $n$ is the capacity or effective capacity of the counter 15; $R$ is the reference value applied continuously to the counter by the logic unit 14.

With an arrangement as above, the phase-error $d$ over the phase circle will be 22.5° at the peak of the range. This can be reduced by half in absolute value if the corrections $R$ are applied, not to the reference values $F$, but midway between the intervals: in such conditions, there is obtained on either side of the correction frequency i.e., a maximum error of the order of 10° at the top of the range.

Obviously, this error will be diminished if the total number of phase steps is increased.

With such an arrangement, when the high frequency $F$ increases, other things being equal, the index of the frequency modulation will increase, since the frequency vector rotates more rapidly over the phase circle, due to the fact that there are fewer steps involved in passing round the circle. If the original maximum frequency excursion is to be retained the intensity of the modulating signal must be reduced. It is for this reason that the gain of the amplifier 13 is variable in accordance with the frequency set in the controller 20.

In FIG. 2, where references common to FIG. 1 have the same significance as in the latter figure, the frequency of the generator 19 is controlled, manually for example, by an element 22. The output frequency of the generator 19 is received by the delay line 17, as before, and is further applied to a discriminator 23 whose output signal is applied to the gain control of the amplifier 13, and on the other hand to the component 14 through an analogue-digital converter 24.

The operation is the same as in the case of FIG. 1; the only difference is that the control signal is provided by the output voltage of the frequency discriminator.

What we claim is:

1. A modulator for frequency modulation of a relatively high carrier-frequency variable over a relatively wide range, comprising: modulator means responsive to a modulation frequency for modulating a relatively low auxiliary carrier-frequency with said modulation frequency; a counter connected to count successive cycles of the modulated auxiliary carrier-frequency; logic circuit means responsive to a signal representing a preselected value of said high carrier-frequency for applying to said counter a fixed minimum reference value corresponding to the preselected carrier-frequency; variable means for generating said preselected high carrier-frequency; a chain of delay elements connected to receive said preselected carrier-frequency and means for switching said delay elements sequentially in accordance with the changing states of said counter to maintain a phase rotation of the order of 360°.

2. A modulator as claimed in claim 1, including an amplifier connected to said modulator means for supplying said modulation frequency thereto, the gain of said amplifier being controlled in accordance with said signal representing said preselected value of said carrier-frequency.

3. A modulator as claimed in claim 2, including circuitry for providing the preselected value of carrier-frequency and a frequency discriminator connected to sense the carrier-frequency, said logic circuit means being connected to the frequency discriminator via an analogue-to-digital converter to sense the carrier frequency.

4. A modulator as claimed in claim 1, including a digital element for indicating said preselected carrier-frequency and generator means connected to said digital element for supplying said preselected carrier-frequency to said chain of delay elements.

5. A modulator as claimed in claim 4, in which the logic circuit means is connected to said digital element to sense said preselected value of carrier-frequency.

6. A modulator as claimed in claim 5, including an amplifier connected to said modulator means for supplying said modulation frequency thereto, the gain of said amplifier being controlled in accordance with said signal representing said preselected value of said carrier-frequency.

7. A modulator as claimed in claim 6, in which said amplifier is connected to said digital element to sense the preselected carrier-frequency via an analogue-to-digital converter.

8. A modulator as claimed in claim 1 in which the logic circuitry includes a memory for holding correction frequencies of the carrier-frequency band.

9. A modulator as claimed in claim 5 in which said amplifier is connected to said digital element to sense the preselected value of the carrier-frequency via an analogue-to-digital converter.

* * * * *